United States Patent [19]

Schröder et al.

[11] 4,288,054

[45] Sep. 8, 1981

[54] DOOR CLOSER MOUNTING ARRANGEMENT

[75] Inventors: Gerhard Schröder, Tiefenbronn; Fritz Feucht, Renningen, both of Fed. Rep. of Germany

[73] Assignee: Vereinigte Baubeschlagfabriken Gretsch and Co., GmbH, Leonberg, Fed. Rep. of Germany

[21] Appl. No.: 932,857

[22] Filed: Aug. 11, 1978

[30] Foreign Application Priority Data

Aug. 13, 1977 [DE] Fed. Rep. of Germany ....... 2736665

[51] Int. Cl.[3] .......................... E04G 5/06; F16M 1/00

[52] U.S. Cl. .................................. 248/225.1; 248/674

[58] Field of Search ............... 248/225.1, 223.3, 224.4, 248/220.2, 73, 221.4, 674, 675

[56] References Cited

U.S. PATENT DOCUMENTS

| | | | |
|---|---|---|---|
| 519,427 | 5/1894 | Groff | 248/221.3 X |
| 1,787,734 | 1/1931 | Rowling | 248/73 UX |
| 1,925,488 | 9/1933 | Kern | 248/73 UX |
| 3,275,274 | 9/1966 | Hutcheon | 248/73 X |
| 3,288,414 | 11/1966 | Fortunato | 248/221.4 |
| 3,822,049 | 7/1974 | Saunders | 248/225.1 |
| 3,854,684 | 12/1974 | Moore | 248/73 X |
| 4,013,880 | 3/1977 | Kennedy et al. | 248/220.2 X |
| 4,037,812 | 7/1977 | Pausche | 248/220.2 X |

*Primary Examiner*—J. Franklin Foss
*Attorney, Agent, or Firm*—Craig and Antonelli

[57] ABSTRACT

An arrangement for mounting a door closer to a stationary or movable door frame. The door frame is provided with a channel rail having longitudinally extending undercut grooves which form transverse guide tongues. Guide projections provided on the door closer are adapted to be received in the undercut grooves so as to be disposed behind the guide tongues. At least one thumbscrew is supported at the door closer and arranged so as to press the guide projections against the guide tongues to thereby mount the door closer at the channel rail.

30 Claims, 6 Drawing Figures

DOOR CLOSER MOUNTING ARRANGEMENT

The present invention relates to a mounting device and, more particularly, to a mounting arrangement for mounting a door closer to a stationary or movable frame of a door.

A door closer mounting arrangement is proposed, for example, in U.S. Pat. No. 2,588,010, wherein the door closer is mounted inside of a horizontal channel rail, which rail, formed as a portion of the frame construction of the door, conceals the door closer. The door closer is mounted by way of a threaded mounting for which suitable bores are provided to facilitate the assembly of the door closer.

One disadvantage of the above proposed door closer mounting arrangement resides in the fact that the drilling of holes in a metal frame and, optionally, the cutting of threads into such holes, results in an assembly which is considerably expensive. A further disadvantage resides in the fact that, if the work is conducted without a drill jig, a satisfactory fitting of the door closer is not always ensured. However, the utilization of a drill jig makes the actual product more expensive. Moreover, to adapt the door closer mounting arrangement for various frame profiles, different door closer sizes and different door closer types, a rather complicated drill jig may be required or it may be necessary to provide several drill jigs.

In Swiss Pat. No. 524,750, a device for mounting a hinge is proposed which provides a possibility of adjustment to thereby eliminate inexactness in the stops. For this purpose, a hinge wing is provided with a guide member having guide projections which extend beneath suitably adapted guide tongues of a guide channel which is mounted on a channel rail of a door by way of a fastener. The guide member is fixedly clamped in the guide channel by way of a thumbscrew. A disadvantage of this proposed construction resides in the fact that the guide channel is an additional part which is subsequently mounted on the channel rail, with the attachment taking place by way of suitable fasteners extending into bores of the channel rail. This particular mounting arrangement has not prevailed on the market and, at any rate, has not yet entered mounting technology for door closers due to some apparently existing prejudices.

A further door closer arrangement is proposed in, for example, U.S. Pat. No. 2,723,416, wherein the door closer is horizontally displaceable on a guide channel and can be clamped, by way of a suitable fastener, in desired positions within certain limits. In this proposed construction, the leverage on the closer linkage can be varied and the door closer can be optionally attached on the right or left. Disadvantages of this proposed door closer reside in the fact that the guide channel is a component of the door closer, not a portion of the frame construction and, in substituting or replacing the door closer, the guide channel must be mounted on the channel rail in the usual manner, which requires drilling work.

In door closer constructions, the door closer transfers forces to its anchoring, which forces are many times greater than, for example, the forces which occur at a hinge. For, in addition to the weight of the door, as is the case in a closer described in the afore-mentioned U.S. Pat. No. 2,588,010, the torque forces due to the closing momentum must be supported. Moreover, these torque forces then occur in alternating direction when a swinging door closer is involved.

The aim underlying the present invention essentially resides in providing a door closer mounting arrangement for mounting a door closer to a stationary or movable frame of a door which makes the assembly of the door construction simple, avoids expensive drilling and makes the use of drill jigs superfluous.

According to advantageous features of the present invention, a channel rail is provided having a longitudinally running undercut groove for forming transverse guide tongues. Guide projections are provided at the door closer which are adapted to extend behind the guide tongues. At least one fastener such as, for example, a thumbscrew is supported on the door closer, by which thumbscrew the guide projections can be pressed against the guide tongues.

According to another advantageous feature of the present invention, at least one holding bracket is provided having guide projections which are adapted to extend behind the guide tongues with at least one thumbscrew being supported on the door closer by which the guide projections can be pressed against the guide tongues so that the door closer may be fixed in position with respect to the holding bracket. By virtue of this construction, in a technical-manufacturing sense, the guide projections are separate from the door closer. Therefore, to adapt the door closer mounting to different frame profiles, advantageously only the holding brackets need to be varied in accordance with the differing frame profiles.

In accordance with yet a further feature of the present invention, the guide projections extending behind the opposite guide tongues are respectively formed by individual members of a bi-partite holding bracket, with the individual members being fixedly secured by the thumbscrew in their mutually opposite positions and with respect to the door closer.

According to the present invention, the members of the bi-partite holding bracket are formed to mutually overlap in zones with at least two bores, disposed in essential alignment with each other in an assembled condition, being provided in the overlapping zone in both members and with the thumbscrew arranged so as to penetrate the bores.

Preferably, according to the present invention, the bores are formed as passage bores and a threaded bore is provided which is essentially aligned with the passage bores. The threaded bore is formed as a portion of the door closer, which portion is arranged between the two members of the holding bracket and the channel rail. The thumbscrew penetrates the two passage bores and the threaded bore and can be pressed against the channel rail with its end face. For this purpose, the end of the thumbscrew is formed as a point or in the manner of annular blades.

In accordance with yet another advantageous construction of the present invention, one of the bores may be formed as a passage bore and the other bore formed as a threaded bore, with one member of the door closer being arranged between the two members of the holding bracket and the channel rail so that the thumbscrew consecutively penetrates the passage bore and the threaded bore and may be pressed against the member of the door closer with its end face which, preferably, is pointed or formed of annular blades.

According to the present invention, the guide projections may extend respectively behind opposite guide tongues with the guide projections being respectively arranged on one lateral leg of an essentially U-shaped holding bracket. The lateral legs are formed so as to be resilient with respect to each other, with an element of the door closer being arranged between a connecting leg of the holding bracket and the channel rail. A thumbscrew is provided which supports itself on a connecting leg and on an element of the door closer.

By virtue of the above-noted features and constructions relating to the provision of a holding bracket, the mounting of a door closer on a stationary channel rail is especially expedient because such features and constructions provide a holding bracket which is formed so as to be inserted in a channel groove which is not accessible from end faces of a channel rail.

In the present invention, a thumbscrew is provided having a conically-shaped threaded section, which thumbscrew is supported with diametrically opposed peripheral surface portions on the door closer or an element of the door closer and on the channel rail or on the holding bracket. By virtue of this construction, it is possible to produce especially great supporting forces between the guide projections and the guide tongues and, consequently, to ensure a secure holding of the door closer.

According to an additional feature of the present invention, a tang is mounted on the door closer, which tang is capable of contacting the channel rail on an end face thereof. The tang may extend behind the end face of the channel rail provided for mounting or a supporting surface of the frame construction equivalent thereto. The support tang in connection with clamp-type mountings provides a shape-mating support of the door weight and, at the same time, is an additional assembly aid since the support tang clearly determines the mounting position of the door closer along the guide grooves.

In this connection, the necessity of utilizing a drill jig in conventional mounting of door closers is based on the fact that the position of the door closer must be exactly maintained with respect to a given reference edge, for example, the vertical and horizontal outside edges of a door. Due to the horizontal guide tongues in a channel rail, the alignment with respect to a horizontal reference surface is necessarily given; however, there is no reference with respect to a vertical surface. By virtue of the provision of a tang such as proposed by the present invention, a positioning aid is provided and the tang can be formed as a stop mechanically abutting a vertical reference surface, especially as a stop tang capable of contacting the horizontal rail on the end face. However, the tang in accordance with the present invention may also be formed approximately as a spacing gauge, wherein the aligned position of its end edges with the vertical reference surface of the channel is to be determined visually or by groping. The vertical surface of a channel rail may be any surface resulting from the frame construction of the door or door frame such as, for example, an end face of a horizontal channel rail or a broad face of a vertical rail adjoined thereto.

According to the present invention, the channel rail may have at least one channel which runs parallel to the longitudinally running undercut grooves with the at least one channel preferably having a circular cross-sectional shape. The tang may be formed overlapping the channel and have a bore aligned with the channel. A fastener such as a screw may penetrate the bore and tighten the tang mounted on the door closer against an end face of the channel rail. The screw may be threaded into the channel in a self-cutting manner. Moreover, according to the present invention, fitting pins or the like, preferably symmetrical with respect to the screw, may be inserted into additional bores of the tang and channels of the channel rail aligned therewith for supporting the torque momentum.

Additionally, the channels provided for receiving the fitting pins may be formed continuously over an entire length of the channel rail.

Furthermore, according to the present invention, the undercut grooves and the channels may terminate at a freely accessible position at least on an end face of a pivot bearing side of the channel rail toward the outside. A cover cap may be provided for concealing the end face zone and the mounting screw for the cover cap may tighten the cover cap together with the tang mounted on the door closer against an end face of the channel rail.

By virtue of the last-mentioned developments in accordance with the present invention, the tang may be formed as a basic part of an especially stable mounting zone. However, it would be required that the end face of the channel rail be exposed and, consequently, this simpler construction would be more readily adaptable, though not exclusively, to movable frames or doors.

By providing that the guide channel on the frame side, in which guide channel a mating channel on the door closer side is displaceably mounted, is formed on a horizontal channel rail which is part of the frame construction of the door, as proposed by the present invention, the guide profile allows the door closer to be positioned in a predetermined alignment with respect to a vertical reference surface and then to be fixed in position by means of a thumbscrew, as is conventional in hinging, without bores being necessary for this purpose.

By providing that an attached guide rail is to be threadably joined to a channel rail, such as proposed in the afore-mentioned U.S. Pat. No. 2,723,416, would not eliminate the necessity of bores in the assembly of the door closer because then only the guide channel would have to be mounted in a conventional manner, instead of the door closer. By employing a guide channel located directly in a channel rail which is a part of the door construction, as proposed in the present invention, only in this manner can the door closer be mounted without any drilling.

Accordingly, it is an object of the present invention to provide a door closer mounting arrangement which avoids, by simple means, shortcomings and disadvantages encountered in the prior art.

A further object of the present invention resides in providing a door closer arrangement which ensures a satisfactory fitting of the door closer without requiring the use of a drill jig or the like.

A still further object of the present invention resides in providing a door closer mounting arrangement which is readily adaptable to different frame profiles and different sizes and types of door closers.

Another object of the present invention resides in providing a door closer mounting arrangement which ensures a secure holding of the door closer.

Yet another object of the present invention resides in providing a door closer mounting arrangement which is simple in construction and, therefore, inexpensive to manufacture.

An additional object of the present invention resides in providing a door closer mounting arrangement which ensures the proper functioning of the door closer under all operating conditions.

These and other objects, features and advantages of the present invention will become more apparent from the following description when taken in connection with the accompanying drawings which show, for the purposes of illustration only, several embodiments in accordance with the present invention, and wherein.

Figure 1:
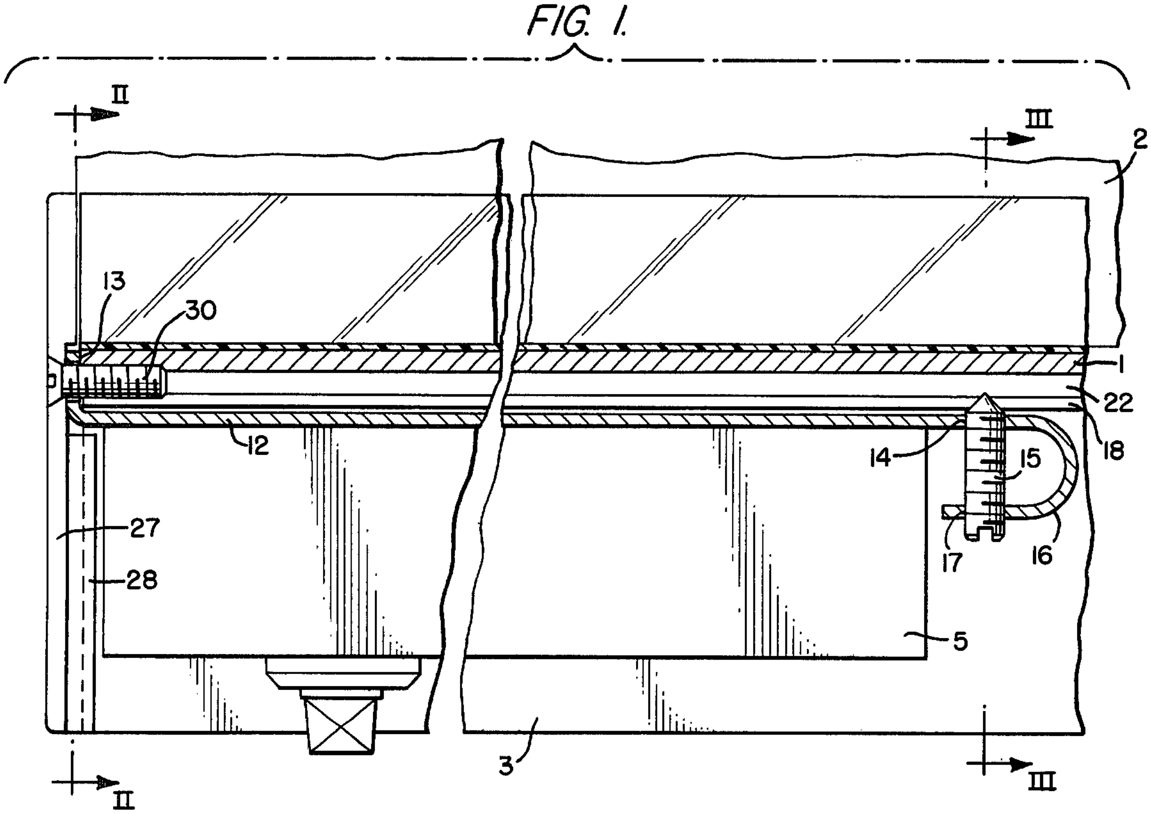
FIG. 1 is a longitudinal cross-sectional view of a door closer mounting arrangement in accordance with the present invention taken along the line I—I of FIG. 2.
Figure 2:
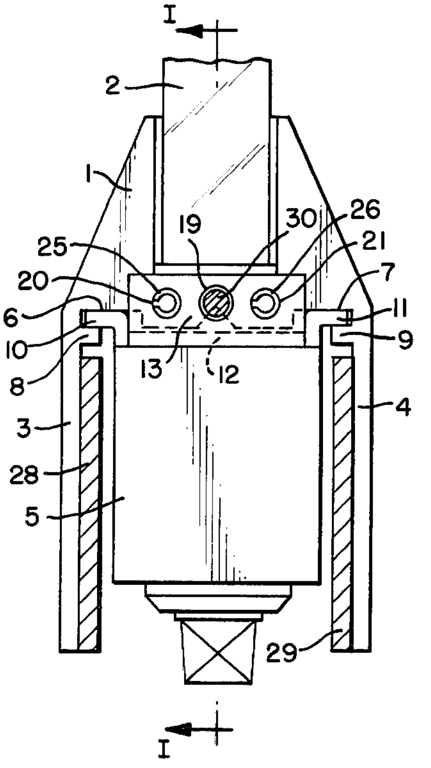
FIG. 2 is a cross-sectional view taken along the line II—II of FIG. 1.
Figure 3:
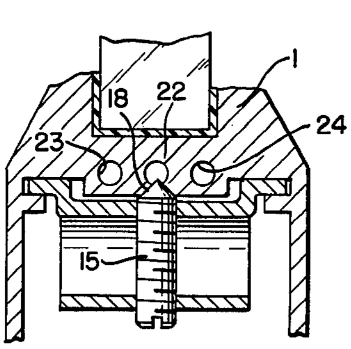
FIG. 3 is a cross-sectional view taken along the line III—III of FIG. 1.

Referring now to the drawings wherein like reference numerals are used throughout the various views to designate like parts and, more particularly, to FIGS. 1-3, a channel rail 1, representing a part of a frame construction of a door wing, is constructed so as to receive a pane of glass 2 on an upper face thereof in a conventional manner with lateral legs 3, 4 of the channel rail 1 forming a cavity for accommodating an essentially conventional door closer 5 which, for the sake of clarity, is illustrated only as a smooth square and not in cross-section. However, it is understood that the square shape is merely schematic and represents any desired closer shape.

Two longitudinally extending undercut grooves 6, 7 are provided in the channel rail 1, resulting in the formation of transverse guide tongues 8, 9. Guide projections 10, 11, adapted to extend behind the guide tongues 8, 9 of the grooves 6, 7, are integrally molded onto a carrier plate 12 which is rigidly attached to the door closer 5 by, for example, welding or the like. A transversely extending upwardly projecting tang 13 is provided on the carrier 12. The tang 13 contacts the channel rail 1 at an end face in the assembled state. A threaded hole 14 is arranged in the carrier plate 12 at an end opposite the tang 13. The threaded hole 14 is provided for receiving a thumbscrew 15. An extension 16 is provided on the carrier plate 12 for improved support. The extension 16 is extended back in a curved condition and includes a second threaded hole 17 aligned with the threaded hole 14 for accommodating a shaft of the thumbscrew 15. A simple method for securing the thumbscrew against rotation consists of cutting the threads of the threaded holes 14, 17 in one working operation and subsequently bending the extension 16 in a direction somewhat toward the carrier plate 12. If the thumbscrew 15 is thereupon threaded in through both threaded holes 14, 17, then the original spacing between the carrier plate 12 and the extension 16 must result upon resilient elastic deflection of the extension 16. The resilient elastic deflection results in a pretensioning which largely prevents the thumbscrew 15 from loosening.

The assembling of the door closer 5 can now be effected by inserting the door closer 5 into the channel rail 1 which is open on the end face, wherein the guide projections 10, 11 penetrate into the grooves 6, 7 and extend behind the respective guide tongues 8, 9. As soon as the tang 13 contacts the end face of the channel rail 1, door closer 5 has reached the correct position. The thumbscrew 15 is then tightened such that its end face, formed as a point, extends into a longitudinal wedge-shaped groove 18 in the channel rail 1 with centering action and is supported therein. This compressive force finds its abutment in that the guide projections 10, 11, at least in a vicinity of the thumbscrew 15, are thus held contacting the guide tongues 8, 9 in a force-derived connection.

As shown most clearly in FIGS. 2 and 3, the tang 13 is provided with prefabricated bores 19, 20, 21 which are aligned with channels 22, 23, 24 in the channel rail 1. Expediently, the channels 22, 23, 24 in the channel rail 1 are prefabricated as continuous channels such as the undercut grooves, which would cause no difficulties in the manufacturing method in the extrusion process. Fitting pins 25, 26 are driven into the bores 20, 21 and into the channels 23, 24 aligned therewith so that even this end of the door closer 5 is stably supported on the channel rail 1.

A cover cap 27 is then placed on the open end face of the channel rail 1 for concealing the door closing mounting from view. The cover cap 27 is securely held against rotation by, for example, lateral ribs 28, 29 disposed on an inner side of the lateral legs 3, 4. A fastener such as, for example, a screw 30 aids in the simultaneous mounting of the cover cap 27 and the door closer 5. For this purpose, a thread shaft of the fastening screw 30 is threaded into the channel 22 in a self-cutting manner until the head of the screw 30 tightens the cover cap 27 and, thus, the tang 13 against the end face of the channel rail 1.

While the guide projections 10, 11 have been described as being rigidly connected to the carrier plate 12, in order to permit adaptation of the mounting arrangement to different guide groove spacings, for example, several suitably adapted carrier plates could be provided. According to the respective shape of the profile, an appropriate carrier plate could then be threadably joined to the desired door closer, possibly at the manufacturer, so that further assembly can take place in the simple manner described hereinabove.

Figure 4:
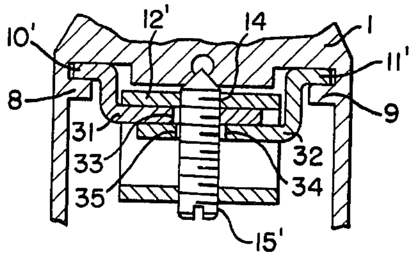
FIG. 4 is a cross-sectional view of a modification of the door closer mounting arrangement in accordance with the present invention.

In the alternative construction of FIG. 4, guide projections 10', 11' are respectively formed on parts or members 31, 32 of a bi-partite holding bracket with each of the members 31, 32 being held in position against each other and against a carrier plate 12' only by way of a thumbscrew 15'. This is achieved by constructing the members 31, 32 so as to be mutually overlapping in zones and to have essentially mutually aligned passage bores 33, 34 in the overlapping zone.

As can be seen in FIG. 4, the thumbscrew 15' penetrates the two passage bores 33, 34, but still permits a transverse displacement of the members 31, 32 only to the extent of the fitting clearance between the shaft of the thumbscrew 15' and the respective walls of the passage bores 33, 34. Due to tensional forces, the member 31 is locked between the carrier plate 12' and the second member 32 of the bi-partite holding bracket. The second member 32 will, in turn, cant somewhat and will support itself on the shaft of the thumbscrew 15' with the lateral wall 35 of the bore 34, which lateral wall is located to the left in FIG. 4. The guide projections 10', 11' are consequently coupled with the carrier plate 12' in force-derived and shape-mating connections and are pressed against the guide tongues 8, 9 in correspondence with the tensional force.

Expediently, the parts or members 31, 32 of the bipartite holding bracket are relatively short, as viewed in a longitudinal direction of the channel rail 1 and may have, for example, a dimension of two cm. Advantageously, to adapt the mounting arrangement to different profile shapes, only the elements 31, 32, the price of which is hardly significant, are to be kept readily available in suitable forms. While it is not necessary for the purposes of adaptation of the mounting arrangement to different profiles to provide a holding bracket which is of a bipartite construction, the bi-part bracket illustrated offers the advantage that each part or member 31, 32 may be independently inserted behind the pertinent guide tongues 8 or 9 from below. Thus, it would be unnecessary for the grooves 6, 7, terminating on the end face of the channel rail 1, to be accessible for the anchoring of the guide projections 10', 11'.

Consequently, a construction of the guide projections 10', 11' in accordance with FIG. 4 can be usefully provided on both ends of the door closer 5 wherein then the screw 30 and the fitting pins 25, 26 and, possibly, also the tang 13 may be eliminated. The door closer 5 would then be inserted from below and, subsequently, the door closer 5 could be coupled with the aid of thumb screws to the members 31, 32 of the holding brackets which, prior to coupling, are loosely suspended behind the guide tongues 8, 9.

The construction of FIG. 4 is advantageous especially in stationary frames of a door because, in such frames, the end face of the channel rail 1, intended for mounting the door closer 5, is often inaccessible since it is generally concealed either by masonry or by other elements of the frame construction.

In a non-illustrated simple kinematic modification of the arrangement of FIG. 4, the positions of the carrier plate 12' and the member 31 in a clamping connection could be changed so that the carrier plate 12' is then clamped between the mutually overlapping members 31, 32 of the holding bracket. The threaded hole 14 would then naturally be provided in the element 31 and the passage bore 33 in the carrier plate 12'.

Figure 5:
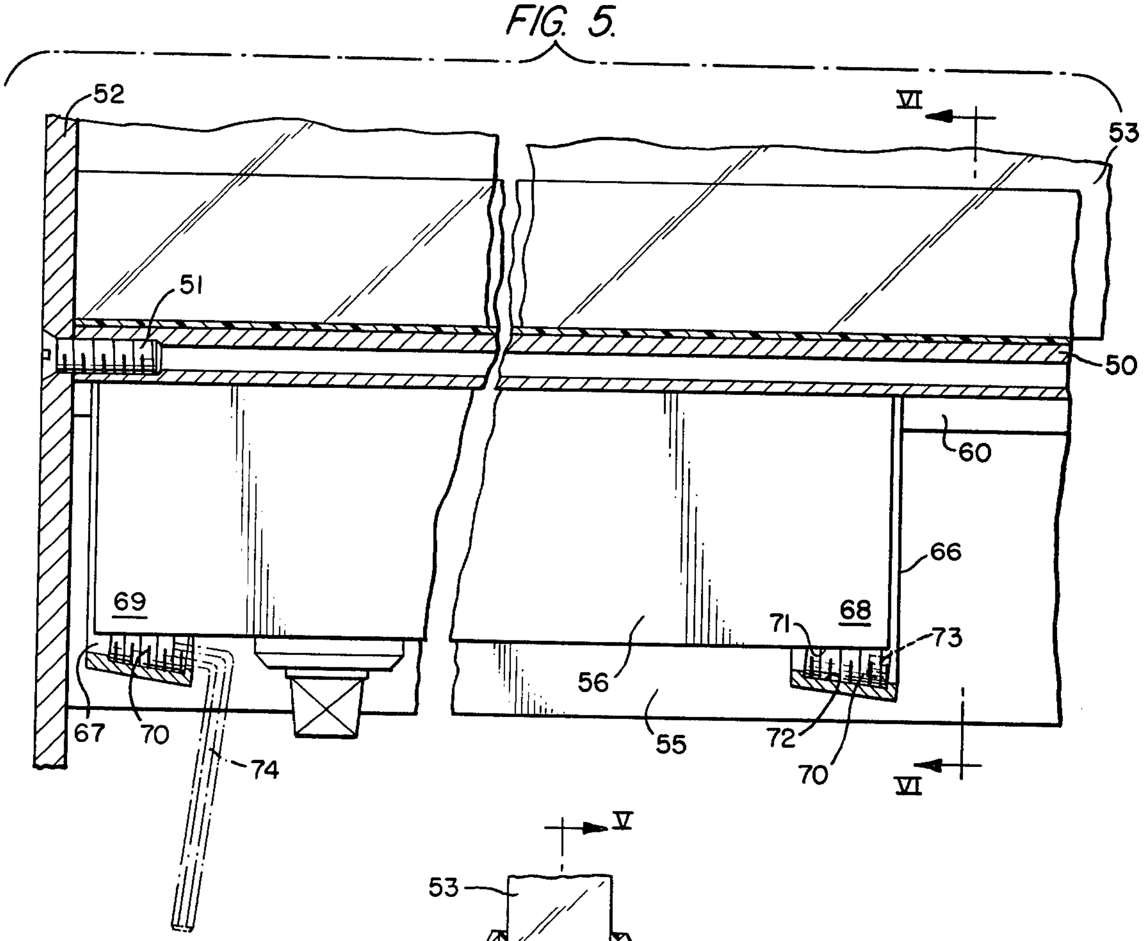
FIG. 5 is a longitudinal cross-sectional view of a further modification of a door closer arrangement in accordance with the present invention taken along the line V—V in FIG. 6.
Figure 6:
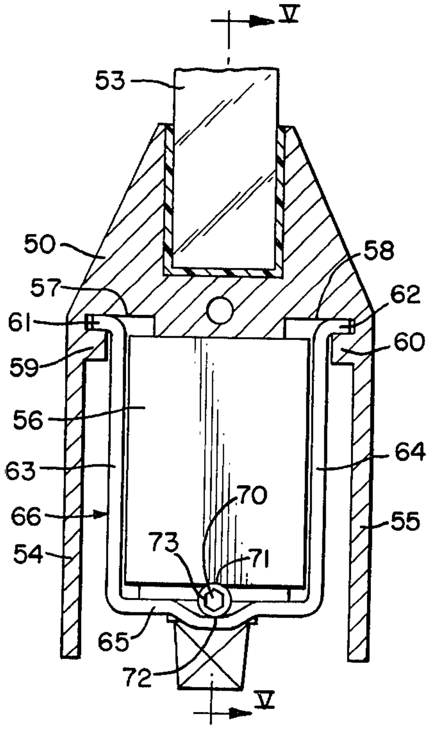
FIG. 6 is a cross-sectional view taken along the line VI—VI in FIG. 5.

FIGS. 5 and 6 provide an example of an alternative construction, according to a preferred embodiment of the present invention. According to these figures, a stationary frame construction is provided which includes a horizontal channel rail 50 and a vertical rail 52 mounted on an end face thereof by suitable fasteners such as, for example, screw 51. The vertical rail 52 may, for example, be embedded in masonry work. The channel rail 50 is constructed so as to receive a pane of glass 53 on its upper face and is provided with downwardly projecting lateral legs 54, 55 which form a cavity in which an essentially conventional door closer 56, schematically represented as a smooth square, is to be mounted.

Two longitudinally extending grooves 57, 58 are provided in the channel rail 50 and form two transversely extending guide tongues 59, 60. Guide projections 61, 62, respectively arranged on lateral legs 63, 64 of an essentially U-shaped holding bracket 66, extend behind the guide tongues 59, 60. The lateral legs 63, 64, connected by way of a connecting leg 65, are inherently elastic insofar as they can be resiliently compressed until the guide projections 61, 62 can be moved past the guide tongues 59, 60. In such a compressed state, the holding bracket 66 may be effortlessly inserted into the grooves 57, 58 from below. The holding bracket 66 subsequently resiliently spreads apart so that the guide projections 61, 62 extend behind the guide tongues 59, 60.

Another holding bracket 67, constructed in the same manner as the holding bracket 66, is provided for mounting the other end of the door closer 56.

The mounting or assembly of the door closer 56 begins by suspending the holding brackets 66, 67 with the guide projections being disposed behind the guide tongues 59, 60 and with the holding bracket 67 already being displaced into its correct assembly position, while the holding bracket 66 is maintained further to the right of FIG. 5. Then the door closer 56 is inserted into the channel rail 50 from below and is displaced toward the left of FIG. 5. The holding bracket 66 is then moved over the right end (in FIG. 5) of the door closer 56. Thereupon the respective thumbscrews 70 are threaded between the connecting leg 65 of the holding brackets 66, 67 and the respective correlated elements 68, 69 of the door closer 56. The thumbscrews 70 have a conically-shaped thread section and are supported in a wedge-like manner with the diametrically opposed peripheral surface portions 71, 72 on the respective connecting legs 65 and on the respective elements 68, 69 of the door closer 56. A mounting engagement such as, for example, a hexagonal hole 73, in which a conventional hexagonal wrench 74 fits, is provided on at least one end face of the thumbscrews 70.

The conical thumbscrew may compensate for spacing tolerances and is located in a self-locking manner in a gap between the holding brackets 66, 67 and the door closer 56. With less total height, good accessibility and an optically favorable mounting position, the conical thumbscrews 70 may apply considerably greater tensional forces than, for example, the axially extending thumbscrew 15 of FIG. 1. The elements 68, 69 of the door closer 56, which elements extend in between the lateral legs 63, 64 of the holding brackets 66, 67, block the lateral legs 63, 64 so that the guide projections 61, 62 are reliably maintained behind the guide tongues 59, 60. As readily apparent, combinations of the above-described mounting devices, as well as kinematic modifications and reversals, fall within the framework of the present invention and the invention is also not limited to the mounting of door closers which simultaneously also act as pivot bearings for a door wing, as in the above examples. Moreover, the term "door closer" may also include motor-driven door openers as well.

While we have shown and described several embodiments in accordance with the present invention, it is to be understood that the same is not limited thereto, but is susceptible of numerous changes and modifications as would be known to a person possessing ordinary skill in the art, and we therefor do not wish to be restricted to the details shown and described hereinabove, but intend to cover all such changes and modifications as are encompassed by the scope of the appended claims.

We claim:

1. An arrangement for mounting a door closer to a stationary or movable door frame having a channel rail, characterized in that the channel rail is provided with longitudinally extending undercut grooves, the undercut grooves form transversely extending guide means, means are provided for suspending the door closer at the channel rail, at least a portion of said suspending means is adapted to be received in the undercut grooves behind the transversely extending guide means, and means adapted to be supported at the door closer are provided for alignment with an end face of the channel rail for exact positioning of the door closer along the channel rail and for pressing said suspending means against said transversely extending guide means so as to securely position the door closer relative to the channel rail.

2. An arrangement according to claim 1, characterized in that the suspending means includes at least one holding bracket provided with guide projections extending into said undercut grooves behind the transversely extending guide means, said pressing means pressing said guide projections against said transversely extending guide means so as to secure the door closer at the channel rail.

3. An arrangement for mounting a door closer to a stationary or movable door frame having a channel rail, characterized in that the channel rail is provided with longitudinally extending undercut grooves, the undercut grooves form transversely extending guide means, means are provided for suspending the door closer at the channel rail, at least a portion of said suspending means is adapted to be received in the undercut grooves behind the transversely extending guide means, means adapted to be supported at the door closer are provided for pressing said suspending means against said transversely extending guide means so as to securely position the door closer relative to the channel rail, the suspending means includes at least one holding bracket provided with guide projections extending into said undercut grooves behind the transversely extending guide means, said pressing means pressing said guide projections against said transversely extending guide means so as to secure the door closer at the channel rail, and in that the holding bracket is of a bi-partite construction and includes two individual members with a guide projection being provided on each of the members, and in that the pressing means fixedly secures the guide projections in mutually opposite positions with respect to each other and the door closer.

4. An arrangement according to claim 3, characterized in that the members are arranged so as to have at least one mutually overlapping zone, a bore is provided in each of the members in the mutually overlapping zone, the bores in each of the members being arranged so as to be essentially in alignment with each other when the members are in an assembled condition, and in that the pressing means is arranged so as to extend through each of the bores.

5. An arrangement according to claim 4, characterized in that the bores are constructed as passage bores, and in that a part of the door closer having a threaded bore is arranged between the two members of the holding bracket and the channel rail, the passage bores and the threaded bores are in essential alignment in an assembled condition such that the pressing means consecutively extends through the two passage bores and the threaded bore with an end face of the pressing means being pressed against the channel rail.

6. An arrangement according to claim 5, characterized in that the end face of the pressing means is one of pointed or formed with annular blades.

7. An arrangement according to claim 4, characterized in that one of the bores is constructed as a passage bore and the other of said bores is a threaded bore, a part of the door closer is arranged between the two members of the holding bracket and the channel rail, and in that the pressing means consecutively extends through the passage bore and the threaded bore with an end face of the pressing means being pressed against the part of the door closer arranged between the two members and the channel rail.

8. An arrangement according to claim 7, characterized in that the end face of the pressing means is one of pointed or formed with annular blades.

9. An arrangement for mounting a door closer to a stationary or movable door frame having a channel rail, characterized in that the channel rail is provided with longitudinally extending undercut grooves, the undercut grooves form transversely extending guide means, means are provided for suspending the door closer at the channel rail, at least a portion of said suspending means is adapted to be received in the undercut grooves behind the transversely extending guide means, and means adapted to be supported at the door closer are provided for alignment with an end face of the channel rail for exact positioning of the door closer along the channel rail and for pressing said suspending means against said transversely extending guide means so as to securely position the door closer relative to the channel rail, the suspending means includes at least one holding bracket provided with guide projections extending into said undercut grooves behind the transversely extending guide means, said pressing means pressing said guide projections against said transversely extending guide means so as to secure the door closer at the channel rail, the at least one holding bracket has an essentially U-shaped configuration and includes two spaced lateral legs joined by a connecting leg, the guide projections are provided at free ends of the respective lateral legs, a part of the door closer is adapted to be arranged between the connecting leg and the channel rail, and in that the pressing means is supported at the connecting legs and at the part of the door closer disposed between the connecting legs and the channel rail.

10. An arrangement according to claim 9, characterized in that the U-shaped bracket is resiliently deformable so as to facilitate insertion of the guide projections in the undercut grooves.

11. An arrangement according to one of claims 4, 5, 7 or 9, for mounting a door closer to a stationary or movable door frame having a channel rail, characterized in that the channel rail is provided with longitudinally extending undercut grooves, the undercut grooves form transversely extending guide means, means are provided for suspending the door closer at the channel rail, at least a portion of said suspending means is adapted to be received in the undercut grooves behind the transversely extending guide means, means adapted to be supported at the door closer are provided for pressing said suspending means against said transversely extending guide means so as to securely position the door closer relative to the channel rail, and in that the pressing means includes at least one thumbscrew.

12. An arrangement according to claim 9, for mounting a door closer to a stationary or movable door frame having a channel rail, characterized in that the channel rail is provided with longitudinally extending undercut grooves, the undercut grooves form transversely extending guide means, means are provided for suspending the door closer at the channel rail, at least a portion of said suspending means is adapted to be received in the undercut grooves behind the transversely extending guide means, means adapted to be supported at the door closer are provided for pressing said suspending means against said transversely extending guide means so as to securely position the door closer relative to the channel rail, the suspending means includes at least one holding bracket provided with guide projections extending into said undercut grooves behind the transversely extending guide means, said pressing means pressing said guide projections against said transversely extending guide means so as to secure the door closer at the channel rail, and in that the pressing means includes at least one thumbscrew having a conically-shaped threaded section, and in that opposed peripheral surface portions of the thumbscrew are supported at one of the door closer, a part of the door closer, the channel rail and the holding bracket.

13. An arrangement according to one of claims 3, 4, 5 or 7, for mounting a door closer to a stationary or movable door frame having a channel rail, characterized in that the channel rail is provided with longitudinally extending undercut grooves, the undercut grooves form transversely extending guide means, means are provided for suspending the door closer at the channel rail, at least a portion of said suspending means is adapted to be received in the undercut grooves behind the transversely extending guide means, means adapted to be supported at the door closer are provided for pressing said suspending means against said transversely extending guide means so as to securely position the door closer relative to the channel rail, the suspending means includes at least one holding bracket provided with guide projections extending into said undercut grooves behind the transversely extending guide means, said pressing means pressing said guide projections against said transversely extending guide means so as to secure the door closer at the channel rail, and in that means adapted to be secured to the door closer are provided for exactly positioning the door closer relative to the channel rail.

14. An arrangement according to claim 13, characterized in that the positioning means includes an upwardly projecting transversely extending tang means for contacting an end face of the channel rail.

15. An arrangement according to claim 14, characterized in that the positioning means further includes a carrier plate secured to the door closer having the tang provided thereon, and in that a curved extension portion is provided on the carrier plate at an end opposite the tang so as to permit a resilient pretensioning of the extension portion.

16. An arrangement according to claim 13, characterized in that at least one channel extending parallel to the undercut grooves is provided in the channel rail, the positioning means is adapted to overlap an end face of the channel and includes at least one bore alignable with the at least one channel, and in that means adapted to extend through the at least one bore of the positioning means are provided for fastening the positioning means against the end face of the at least one channel.

17. An arrangement according to claim 16, characterized in that the fastening means includes at least one self-tapping screw.

18. An arrangement according to claim 17, characterized in that the at least one channel has a circular crosssectional configuration.

19. An arrangement according to claim 16, characterized in that means operatively connected with the positioning means and the channel rail are provided for supporting a torque momentum of the door closer.

20. An arrangement according to claim 19, characterized in that the torque momentum supporting means includes at least two additional channels in the channel rail extending parallel to the undercut grooves, at least two additional bores in the positioning means alignable with the at least two additional channels, and fitting pin means insertible into the additional bores and additional channels.

21. An arrangement according to claim 20, characterized in that the additional bores and additional channels are arranged such that the fitting pin means are symmetrically disposed with respect to said fastening means.

22. An arrangement according to claim 21, characterized in that the at least two additional channels are formed continuously over an entire length of the channel rail.

23. An arrangement according to claim 20, characterized in that the channels and undercut grooves in the channel rail are freely accessible on at least an end face located on a pivot bearing side of the door frame, means are provided for concealing the last-mentioned end face, and in that said means for fastening said positioning means secures said concealing means against the end face of the channel rail.

24. An arrangement for mounting a door closer to a stationary or movable door frame having a channel rail, characterized in that the channel rail is provided with longitudinally extending undercut grooves, the undercut grooves form transversely extending guide means, means are provided for suspending the door closer at the channel rail, at least a portion of said suspending means is adapted to be received in the undercut grooves behind the transversely extending guide means, and in that means adapted to be supported at the door closer are provided for alignment with an end face of the channel rail for exact positioning of the door closer along the channel rail and for pressing said suspending means against said transversely extending guide means so as to securely position the door closer relative to the channel rail, the suspending means includes at least one holding bracket provided with guide projections extending into said undercut grooves behind the transversely extending guide means, said pressing means pressing said guide projections against said transversely extending guide means so as to secure the door closer at the channel rail, and at least two holding brackets are provided, each of said holding brackets including guide projections extending into said undercut grooves behind the transversely extending guide means, said holding brackets are spaced from each other so as to suspend respective ends of the door closer at the channel rail.

25. An arrangement according to claim 24, characterized in that each of the holding brackets has an essentially U-shaped configuration and includes two spaced lateral legs joined by a connecting leg, the guide projections are provided at free ends of the respective lateral legs of each of the holding bracket, a part of the door closer is adapted to be arranged between the respective connecting legs and the channel rail, and in that a pressing means is supported at each connecting leg and at the part of the door closer disposed between the respective connecting legs and the channel rail.

26. An arrangement according to claim 25, characterized in that the U-shaped brackets are resiliently deformable so as to facilitate insertion of the guide projections of the respective brackets in the undercut grooves.

27. An arrangement according to claim 26, characterized in that the pressing means includes at least one thumbscrew interposed between the respective connecting legs and the part of the door closer disposed between the respective connecting legs and the channel rail, each of the thumbscrews includes a conically-shaped threaded section, and in that opposed peripheral surface portions of the respective thumbscrews are supported at one of the door closer or a part of the door closer and the channel rail or the respective holding brackets.

28. An arrangement according to claim 27, characterized in that the channel rail is freely accessible at least an end face at which the door closer is to be mounted, means are provided for concealing the last-mentioned end face, and means are provided for fastening said concealing means against the end face of the channel rail.

29. An arrangement according to claim 28, characterized in that the concealing means includes a vertically extending rail.

30. An arrangement according to claim 29, characterized in that the fastening means includes at least one channel provided in the channel rail extending parallel to the undercut grooves, at least one bore provided in the vertical rail alignable with the at least one channel, and means extending through the at least one bore of the vertical rail and into the at least one channel to secure the vertical rail against the end face of the channel rail.

* * * * *